2 Sheets--Sheet 1.

E. W. IVES.

Improvement in the Mode of Constructing Axle-Boxes.

No. 5,118. Reissued Oct. 29, 1872.

Witnesses:

A. Bennemendorf.
H. L. Wattenberg

Inventor:

Eldridge W. Ives
per W. H. Singerly
Atty

AM. PHOTO-LITHOGRAPHIC CO. N.Y. (OSBORNE'S PROCESS.)

E. W. IVES.

Improvement in the Mode of Constructing Axle-Boxes.

No. 5,118. Reissued Oct. 29, 1872.

Witnesses.
Geo. W. Rothwell
A. C. Bradley

Inventor:
Eldridge W. Ives,
by G. M. Hopkins
Atty.

AM. PHOTO-LITHOGRAPHIC CO. N.Y. (OSBORNE'S PROCESS.)

UNITED STATES PATENT OFFICE.

ELDRIDGE W. IVES, OF MOUNT CARMEL, CONNECTICUT, ASSIGNOR OF PART INTEREST TO DOTIUS D. IVES.

IMPROVEMENT IN THE MODE OF CONSTRUCTING AXLE-BOXES.

Specification forming part of Letters Patent No. 114,148, dated April 25, 1871; reissue No. 5,063, dated September 17, 1872; reissue No. 5,118, dated October 29, 1872.

*To all whom it may concern:*

Be it known that I, ELDRIDGE W. IVES, of Mount Carmel, in the county of New Haven and State of Connecticut, have invented a new and useful Improvement in the Mode of Constructing Carriage-Axle Boxes; and that the following is a full, clear, and exact description of the same, reference being had to the accompanying drawing and to the letters of reference marked thereon making part of this specification.

The nature of my invention is an improvement in the construction of axle-boxes for carriages and other vehicles; and the invention consists in making such axle-boxes of rolled sheet metal and forming and completing the same in dies, substantially as hereinafter described.

To enable others skilled in the art to make and use my invention, I will now proceed to describe its construction, referring to the accompanying drawing and to the letters marked thereon.

Figure 1:
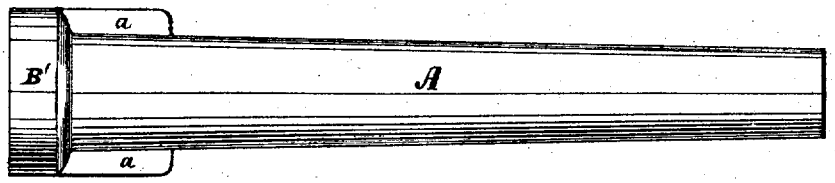
Figure 2:
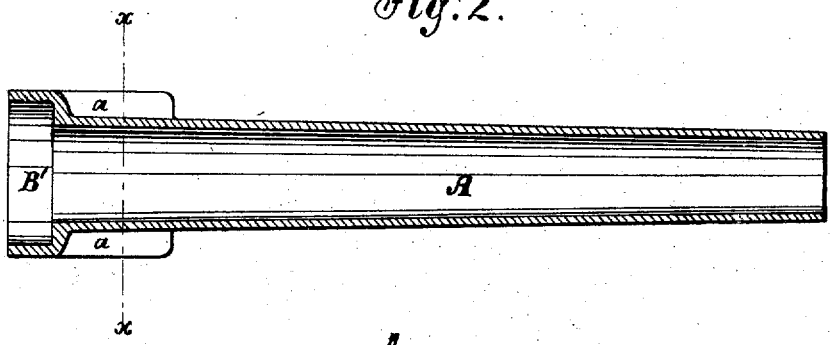
Figure 3:
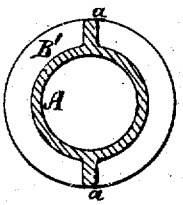
Figure 4:
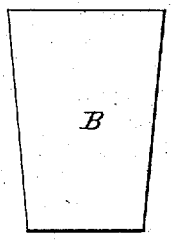
Figure 5:
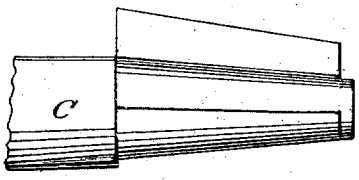
Figure 6:
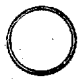
Figure 7:
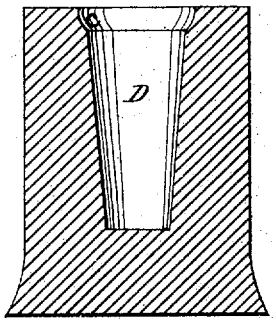
Figure 8:
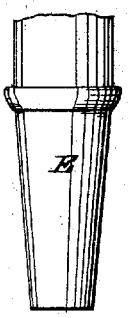
Figure 9:
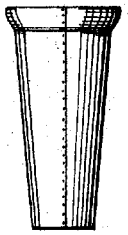
Figure 10:
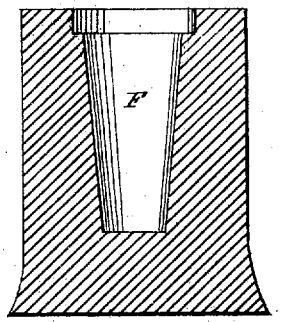

Figure 1, Sheet 1, represents a side elevation of my box; Fig. 2 is a longitudinal section of the same; Fig. 3 is a transverse section taken on the line *x x*, Fig. 2; Fig. 4, Sheet 2, is a plan view of blank; Fig. 5, side view of mandrel, with blank partly inclosing same; Fig. 6, top view of blank removed from mandrel; Fig. 7, longitudinal section of first female die; Fig. 8, side view of first male die; Fig. 9, side view of box after passing through the first male and female dies; Fig. 10, longitudinal section of second female die; and Fig. 11, side view of second male die.

Figure 11:
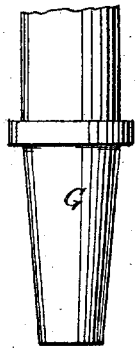

In the construction of my axle-box A I take a blank, B, formed of rolled sheet metal, and form it around a conical mandrel, C, Fig. 5, in this way producing a conical tube. This conical tube is next inserted in a female die, D, the interior of which is of the exact size and form of the exterior of the axle-box designed to be formed therein, and having a flare, *c*, at its upper end which will flare the metal of the box in corresponding manner, and thus make the first formation of the collar B′. Fitting into the female die D just described is a male die, E, corresponding in every particular with said female die, except that it is slightly smaller to allow for the thickness of the metal box. The male die E is forced into the box by any suitable drop or other force, and, as will be seen, the metal is struck up to correspond with the dies just described. The box is now removed from the first pair of dies, just named, and inserted into a second female die, F, which is of the exact size of the exterior of a finished axle-box, and having formed at its upper end a recess for completing the collar B′, before referred to, by squaring up the shoulders of the same, as shown in Figs. 10 and 11, a male die, G, corresponding with the female die F and representing exactly the interior of the axle-box being forced into said box, now in the die F, for this purpose. This is the final process in completing the box.

The advantages of my box over a cast-iron box are that, as in making the cast-iron box the box had first to be cast, then bored out, its outer surface turned, and then its ends cut squarely off, and as the metal I use is rolled sheet metal, and as the dies stamp the blank forms into proper shape, the casting, boring, turning, and shaping the ends are all dispensed with, and I produce an article which is not only far cheaper, but lighter and neater than those which are cast.

Having thus described my invention, what I claim as new, and desire to secure by Letters Patent, is—

1. The method herein described of making axle-boxes.

2. I claim, severally, the two pairs of dies, herein described, for forming axle-boxes.

ELDRIDGE W. IVES.

Witnesses:
H. L. WATTENBERG,
G. M. PLYMPTON.